United States Patent Office 3,428,520
Patented Feb. 18, 1969

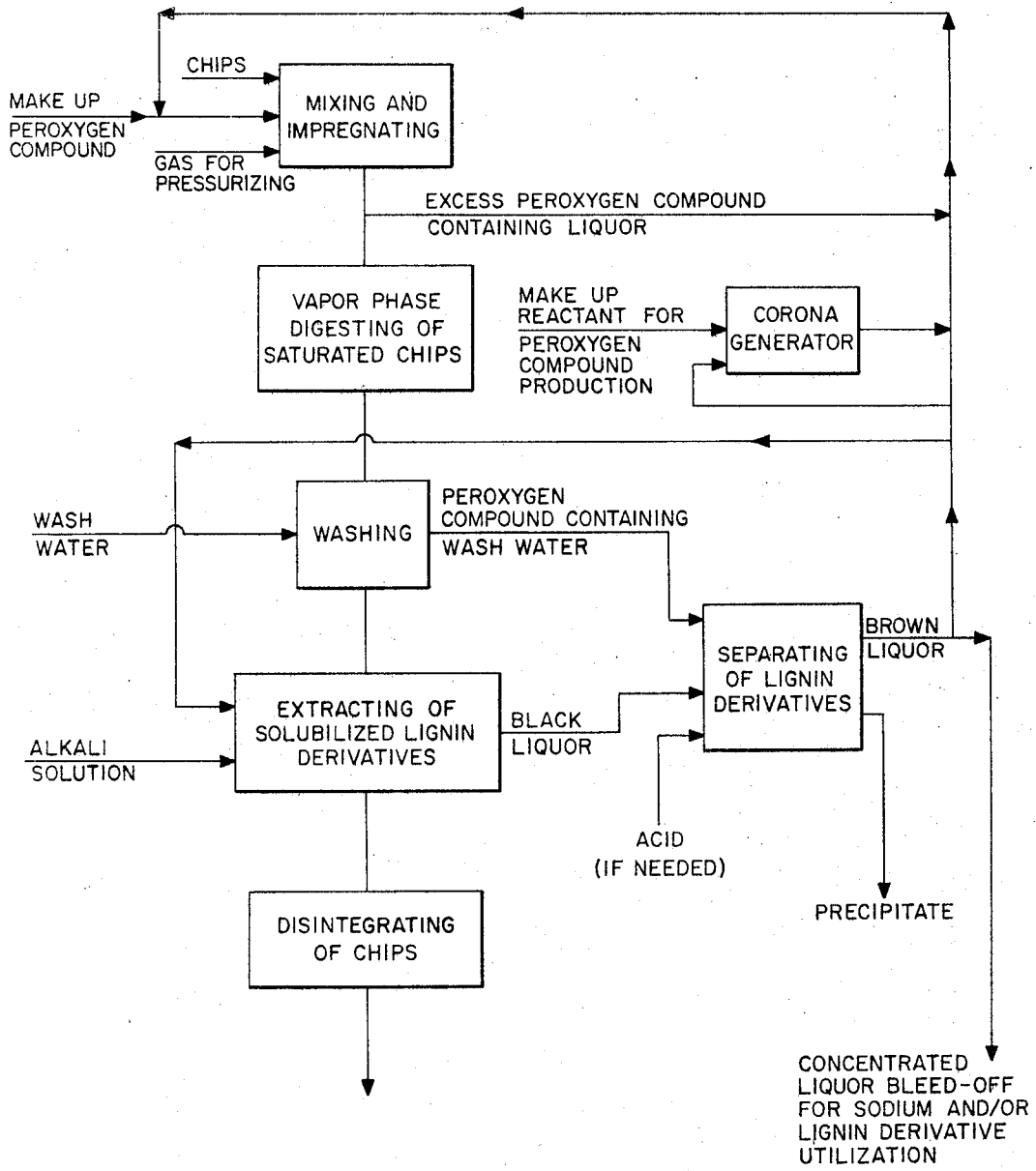

3,428,520
PULPING PROCESS WITH LIGNIN RECOVERY
Peter N. Yiannos, Wilmington, Del., assignor to Scott Paper Company, Philadelphia, Pa., a corporation of Pennsylvania
Filed Aug. 12, 1965, Ser. No. 479,272
U.S. Cl. 162—38                3 Claims
Int. Cl. D21c 3/22, 3/00

ABSTRACT OF THE DISCLOSURE

Process for recovery of pulping by-products and unused digesting materials, in which chips are impregnated and pulped with organic peroxygen compounds by vapor phase digestion with subsequent caustic solubilization, by separating the chips from the caustic extraction liquor, adding an acid to said liquor to precipitate certain lignin derivatives, removing said precipitate to retain a brown liquor, separating said brown liquor into first and second fragments, recycling siad first fragment to said caustic extraction step for recycling whereby lignin content of the liquor is continuously increased, and recycling said second fragment to said chip impregnation step.

---

This invention pertains to pulping of ligno-cellulosic materials contained in stems of vascular plants and, more particularly, to a peroxide pulping process whereby various process streams are worked up to produce useful fractions or are integrated in recycled streams to allow a more efficacious use of starting reactants, solubilized lignin derivatives and other encrustants.

In my application Ser. No. 462,116, filed June 7, 1965, I disclosed a process for pulping ligno-cellulosic materials by means of organic peroxides. This invention presents an improvement of my process disclosed in the above-identified case. More specifically, this invention involves a unique recirculation of solubilized lignin material which has been separated into fractions wherein certain of the fractions are utilized to enhance the recovery of values obtainable from ligno-cellulosic materials.

Conventional wood pulping methods require recycling of the pulping chemicals for various reasons. Pollution problems have necessitated recycling and reutilization of pulp-freeing chemicals. Process economics similarly require the utilization of all wastes. Ease of handling wastes may further necessitate re-working of the effluent streams.

While most of the prior-art pulping processes are geared to recycled processes recovering inorganic pulp-freeing materials, there has been a notable lack of success in utilizing the organic residues from the pulping processes.

As is well known, most of the inorganic materials used in the various pulping processes are recovered by burning evaporated or spent liquor. Smelts obtained by means of this operation are then worked up to recover either an appropriate sulfite liquor or a sulfate liquor. In this approach all of the organic material in the spent liquor is burned to allow continuous operation and to provide process steam useful in the mill.

Obviously, if new and improved means can be found to recover values from the lignin portion of wood and at the same time alleviate pollution or disposal problems, the economics of the process may be improved not only because of spent-liquor processing, but also because of utilizing values contained in solubilized lignin-derivative streams.

It has now been found that unexpected advantages have been achieved in overcoming some of the prior-art problems by utilizing the various process streams of lignin derivative by treating and recirculating solubilized lignin derivative and separating out concentrated lignin derivatives.

As discussed in my previously described invention, active oxygen pulping is carried out by impregnating ligno-cellulosic materials such as wood chips with an appropriate active oxygen compound such as peracetic acid, or, an inorganic active oxygen-containing material such as chlorine dioxide, all as previously described in my application. Next, the impregnated chips are digested after being drained from the organic peroxide solution. Obviously, the impregnation and digesting steps may go on at the same time or these steps may be done independently. In the second stage of this pulping process, lignin derivatives and other encrustants produced in situ by the peroxygen compound are solubilized by means of sodium hydroxide. This solubilized lignin derivatives, in turn, is combined with the wash water obtained from washing the chips after the first stage to precipitate a considerable portion (in some instances up to one-half) of the lignin derivative. The remaining solution still contains a considerable amount of sodium, peroxygen compound or its buffered derivative, and lignin-derivative fractions.

Peroxide compounds useful in the present process are the water-soluble and stable, or capable-of-stabilization at up to 50° C., preferably up to 100° C., alkyl hydroperoxides, alkyl peroxides, acyl hydroperoxides, acylperoxides, acylalkyl, peroxides, hydroxy alkyl hydroperoxides, hydroxy alkyl peroxides, ozonides, oxozonides and alkylidene peroxides, etc. In the above molecules the alkyl is preferably of the low-carbon atom chain variety which is stable at the process conditions and in the impregnation environment used and has a higher percentage of active oxygen for its molecular weight. Similarly, the acyl compounds are preferably those that are stable in the same range as given above and, in addition, are water soluble. Of the above group, the acyl hydroperoxides such as performic, peracetic, perbutyric, perpropionic, pervaleric, percaproic, etc. are the preferred sub-group of compounds. Of these, peracetic acid is the preferred species.

In particular the present process sequence is accomplished by the use of peracetic acid as the preferred species, in the impregnating or oxidation sequence at a temperature of from about 20° C. to about 30° C. and a pressure of from about 1 atm. to about 20 atm. in the impregnating step.

Wood chips derived from soft woods (derived from some gymnosperms) and hardwoods (derived from some angiosperms) are useful in the present process. Of the softwoods, the coniferous species such as spruce, pine, hemlock, fir, cedar, etc. are the most desirable. Of the hardwoods, those useful in the present pluping process are: alder, aspen, beech, oak, gum, birch, etc.

Although the penetrating step at higher temperature may be of importance if the digesting reaction is carried out at low concentrations of the peracid, it has been found that at higher concentrations of peracid, e.g., from about 5% to about 30%, the impregnation and digesting steps take place rapidly. This is true in particular when the L/W (liquor to wood) ratio is high. In other words, as impregnation takes place, so does reaction of the peracetic acid with lignin. Generally, the acceptable range of peracetic concentration is of from about 1% to about 10%, but at higher temperatures the peracid is more likely to decompose. Generally, stabilization of the acid may help overcome fast exhausting of the peracid from the solution. It has been found that, by decreasing the temperature and increasing the concentration of peracid in the solution, exhaustion of the peracid from the solution due to decomposition is reduced.

Further, it has been found that by including in the peracid the known peracid, perester, perether, etc. stabilizers such as chelating agents, the exhaustion problem due to the peroxide compound decomposition may be markedly minimized and the yields of pulp based on the amount of acid used increased. Again, the nature of contaminants in the pulped material, such as metals, may affect to a considerable degree the exhaustion of the peracid. As mentioned before, the pH of the peracid solution may be held at below 7 and, with peracetic acid, preferably of from about 4 to about 5. If need be, the peracid solution may be adjusted by means of sodium hydroxide or a buffering solution such as sodium acetate to render the peracid solution more effective.

The lignin derivative-containing solution is used in the peroxygen pulping process to further enhance the obtained by-product valve, thereby removing the loads normally imposed on conventional by-product recovery recovery equipment such as evaporators.

Thus, the present invention is achieved by combining an acid or the acidic wash water separated from the saturated and digested starting chips and using it to precipitate a lignin-derivative fraction from "black" liquor; thereafter recycling the precipitate-free liquor to the alkali-extraction stage and/or diverting it to the peracetic acid-carrying stream.

Normally, liquor recovered by alkali solubilization of the lignin derivative is brown and, therefor, the term "brown" liquor is intended to mean spent liquor recovered from the lignin-precipitation stage in the form of brownish liquor as a decanted liquor from the precipitate in that stage. This brown liquor is combined directly with the peroxygen compound-containing solution and introduced in the mixing and impregnation zone.

Alternatively, and in the more preferred embodiment, this brown liquar is sprayed in an ozonator which consists of a sulfuric acid-filled tube enclosed in a glass envelope having a sulfuric acid jacket. In the ozonator there is an inlet for brown liquor and oxygen, an outlet which is capable of separating the gases present in the tube and the brown liquor stream-containing peroxygen compounds. The inner sulfuric acid-filled tube and the outer jacket have a potential across them which gives an electric discharge resulting in the production of atomic oxygen and subsequent combination of this atomic oxygen with the brown liquor moieties resulting in the peroxygen compound. Generally, a portion of these peroxygen compounds, such as peracids, may be recirculated through this electric discharge machine until sufficient peroxygen compounds have built up, and if needed, these components are separated and introduced in the pulping zone. Alternatively, the brown liquor to the ozonator may be treated with hydrogen such as in presence of a catalyst (nickel) and then the obtained aldehydic groups transformed into peroxygen compounds.

As can be envisioned, various amounts of acetic acid and the brown liquor can be blended to produce peroxygen compounds of various types via this active or atomic oxygen-producing means. Thus, the lignin recovery stage serves as a self-sustaining source of pulping raw material sufficient in amount to achieve the desired pulping of the ligno-cellulosic materials. Such sustaining operation, of course, is very desirable and, therefore, any savings are important that may be effected as the result of utilizing substantially all waste matter heretofore thought to be in no way useful in pulping processes. moreover, the recovered lignin precipitate offers further advantages in the pulping operation.

In view of the above, reference is made to the drawing in which:

The figure is a schematic drawing of the process flow sheet with all the in-streams in each particular step leading in from the left and the out-streams leaving each patricular step towards the right and wherein all useful by-product or desired product streams are leading downward.

As shown by the figure, the wood in the form of chips enters a mixing and impregnating zone. Generally, the chip sizes may be varied over a considerable range. However, it is preferred to have chips of the size easily digested by the liquid and, therefore, the rate of penetration would generally be the governing factor of the size chosen.

Liquors useful in impregnating the chips are derived initially from a solution of the peroxygen compound in a sufficient concentration, generally of from about 1% to 20% concentration of the peroxygen compound per unit of liquid. After the pulping process has settled to an operating equilibrium, brown liquor is used as the main penetrating liquor with the make-up peracetic acid supplementing it to bring the total introduced liquor up to the required strength. The introducing of the brown liquor serves a number of useful functions. One, recirculating the brown liquor from the separating stage and thereby processing it with the chips all the way to the extracting stage and separating it out as black liquor allows the continuous upgrading of this liquor until its concentration is such that it starts to detract from the actual impregnating and digesting step. Two, this upgrading of the liquor removes a considerable amount of a load that would be normally imposed on a bank of evaporators as this brown liquor may be bled off at a concentration such that its further working up becomes less costly. Generally, this concentration is such that it does not interfere with subsequent use of the liquor. Maximum concentration would depend on the molecular weight and the hydrophodic character of the lignin derivatives. It has been found that in the extraction recycle even twelve recycles of brown liquor had no adverse effect on the pulping process. Similarly, recycling brown liquor seven times through the impregnation stage (after fortification with peracetic acid) had no adverse effect on the pulping process.

After the mixing and impregnating step, chips are drained from the excess peroxygen compound containing liquor and this liquor is recycled to the process by either adding it directly to the brown liquor or reintroducing it into the mixing and impregnating zone.

In the vapor phase digesting of saturated chips the temperature may be kept in the range of from about 20° C. to about 30° C. or it may be optionally brought up from about 30° C. to about 90° C. and held at this temperature for about fifteen minutes to about 120 minutes. Chips, after the digesting step, are optionally washed with water which may then subsequently be utilized for the purposes described below.

Next, in the extracting or solubilizing of lignin derivative stage the following process streams may be utilized. One, an alkaline solution, but more preferably, a sodium hydroxide solution of from about 1% to about 5%, but preferably below 3%, is used to solubilize the lignin derivative. Two, the sodium-containing brown liquor from the lignin derivative separating stage may be introduced into the extracting stage to utilize the brown liquor in aiding the solubilization or minimizing the excessive dilution of the solubilized lignin derivative.

After the cellulosic material is separated from lignin derivatives and other encrustants it is then disintegrated to further prepare it for sheeting into paper.

The black liquor recovered from the lignin extracting stage is combined with wash water to precipitate out a fraction of the lignin derivative. If there is no washing step an amount of acid sufficient to precipitate a fraction of the lignin is added in order to obtain the precipitate as well as the brown liquor. This brown liquor, as previously mentioned, is recycled either to the extracting stage to aid in the solubilizing of the lignin or a portion of it is diverted for introduction into the mixing and impregnating stage.

The portion diverted to hte mixing and impregnating zone may be, in turn, diverted for producing the peroxygen compounds in the corona generator previously described.

This brown liquor may, by itself, serve to supply a portion of the needed peroxygen compounds or a portion of peracid may be produced by introducing the brown liquor and an acid, preferably an acetic or formic acid, into the corona generator. Resulting liquor may then be either recycled or introduced into the remaining brown liquor stream and combined with the excess peroxygen compound separated from the impregnating step for introduction into the mixing and impregnating zone.

From the lignin fraction separating stage the brown liquor may be bled off after it has, through recycling, either via the impregnating stage and/or the extracting stage, built up to a desired concentration, e.g., 15% to 20%, based on the liquid. Even higher concentrations are obtained if desired. The precipitate from the lignin fraction separating zone is recovered in the form of granulated precipitate which then may be used in wet-strength resin applications. In the examples to follow all parts are by weight unless otherwise expressed. These examples are merely illustrations of the invention and are not intended to limt the broader scope of the invention.

EXAMPLE 1

Ten grams of air-dry beech veneer chips were impregnated with 7.8% peracetic acid solution of pH=2.0. The impregnation was carried out at room temperature using nitrogen pressure at 150 p.s.i. for 15 minutes. The excess liquor was then drained off the saturated chips (1.1:1 liquor-to-wood ratio) which were heated at 90° C. for one-half hour. At the end of the vapor phase cook, the chips were washed with 35 cc. of hot water to remove the acids and other soluble matter in the chips. The washed chips were then treated with 2% NaOH solution at 5:1 liquor-to-wood ratio or 10% on the wood for one hour. This was done at 90° C. The black liquor formed as a result of the extraction was drained off the chips and acidified with the wash water from the first stage. The chips were disintegrated with relative ease and formed pulp of 73% yield based on the wood. The mixture of wash water and black liquor resulted in a brown precipitate amounting to about one gram or about one-third of the dissolved wood.

EXAMPLE 2

The brown supernatant liquor which contained the other two-thirds of the disolved wood was mixed with fresh peracid solution to bring the concentration up to 7% to 8% and used for impregnating fresh beech veneer chips of the same species and treating them as in Example 1. The procedure was repeated seven times with similar results in pulp yield and lignin precipitate. No sign of deterioration was evident at the end of the seventh cycle. If desired, further recycling can be carried out.

EXAMPLE 3

Ten grams of air-dry poplar veneer chips were impregnated with 7.6% peracetic acid at a pH of 2.5. The cooking procedure was the same as that of Example 1. The pulp yield was 70% of the wood and the ligneous precipitate was close to one gram or one-third of the dissolved wood. The brown supernatant liquor was mixed with NaOH and reused in the extraction stage. The procedure was repeated twelve times, in each case producing pulp of similar yield and liquor yielding similar precipitate upon mixing with the wash water. At the end of the 12th cycle there was no sign of deterioration in the pulping process or the liquor behavior. The brown supernatant liquor at the end of the 12th cycle contained approximately two-thirds of the total dissolved wood or 24 grams. The total volume was about 150 cc. which amounted to about 16% aqueous solution in dissolved wood. In addition this solution contained the sodium metal from NaOH used in the extraction. At the end of the 12th cycle this amounted to about 10% sodium solution in the organic form.

EXAMPLE 4

Example 3 was repeated with poplar pin chips and the results were identical in all respects. Thus, chips larger than the veneer ones behave the same way. The pin chips were about 0.100″ thick and between about ½″ to 2″ long and about ¼″ wide.

As described above, the ability to utilize the various lignin derivative containing streams in the manner described enhances the pulping operation by eliminating or minimizing steps such as evaporation. Moreover, by using some of the lignin derivative containing streams as recycling or reactant carrying vehicles, the desirable fractions of lignin may be separated out and the remaining fractions recirculated for purposes of solubilization or digesting or even for purposes of producing materials generating the starting reactant and therefore rendering the process self-sustaining except for the make-up reactants needed to operate the process at the desired level of efficiency.

What is claimed is:
1. In the process for pulping chips or lignocellulosic material comprising polysaccharides and lignins to liberate the polysaccharides from the lignin and to obtain a pulp therefrom, by impregnation of said chips with a solution of an organic peroxygen compound and subsequent vapor phase digestion of said chips by oxidation of said lignin with said organic peroxygen compound to render said lignin caustic extractable, the improvement comprising the steps of:
   (a) extracting solubilized lignin derivatives from said chips by contacting said oxidized chips with an alkali solution,
   (b) separating said chips from said solution,
   (c) adding an acid to said solution to precipitate at least some of said lignin derivatives therefrom,
   (d) separating said precipitated lignin derivatives from said solution to retain a brown liquor,
   (e) separating said brown liquor into two portions,
   (f) mixing one portion of said brown liquor with alkali and recycling the same to the extraction step, and
   (g) recycling the other portion of said brown liquor for impregnating chips for subsequent digestion.

2. A process as set forth in claim 1 wherein said impregnated chips are washed with water immediately after vapor phase digestion, and such wash water is admixed with said alkali solution after said chips have been separated therefrom.

3. A process as set forth in claim 1 wherein at least part of said other portion of said brown liquor has added thereto an organic acid and said organic acid replenished liquor is oxidized by treatment with ozone in a corona generating zone to oxidize said liquor to produce organic peracids.

References Cited

FOREIGN PATENTS 289,774   5/1929   Great Britain.

S. LEON BASHORE, *Primary Examiner.*

U.S. Cl. X.R.

162—43, 45, 16

UNITED STATES PATENT OFFICE
CERTIFICATE OF CORRECTION

Patent No. 3,428,520 February 18, 1969

Peter N. Yiannos

It is certified that error appears in the above identified patent and that said Letters Patent are hereby corrected as shown below:

Column 6, line 27, "or" should read -- of --.

Signed and sealed this 24th day of March 1970.

(SEAL)
Attest:

Edward M. Fletcher, Jr.
Attesting Officer

WILLIAM E. SCHUYLER, JR.
Commissioner of Patents